Patented July 15, 1952

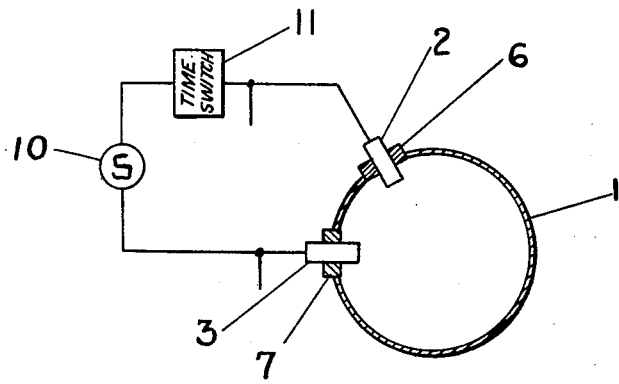
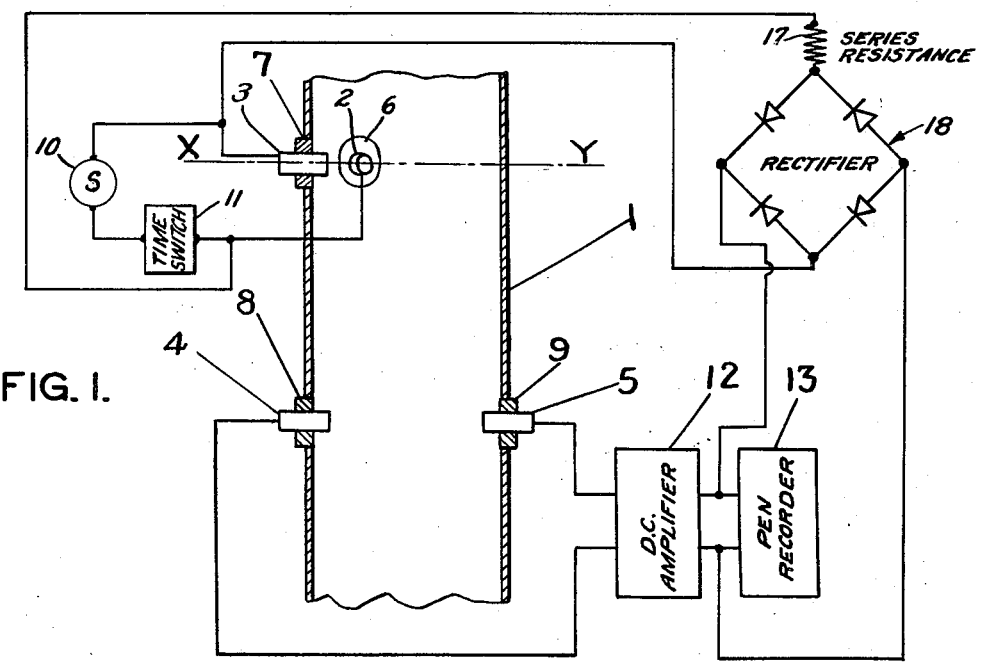
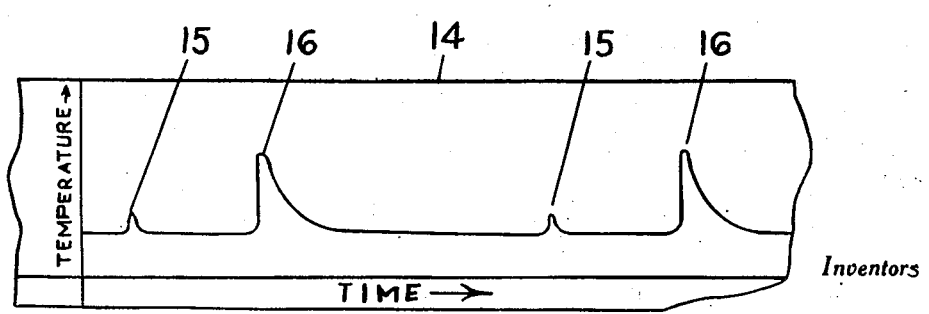

2,603,089

UNITED STATES PATENT OFFICE 2,603,089

APPARATUS FOR MEASURING THE RATE OF FLOW OF PARTICULATE SOLIDS THROUGH VESSELS

Ronald James Morley and Selwyn Forbes Weston, Norton-on-Tees, England, assignors to Imperial Chemical Industries Limited, a corporation of Great Britain Application August 14, 1947, Serial No. 768,518
In Great Britain August 14, 1946

4 Claims. (Cl. 73—204)

This invention relates to measuring the rate of flow of particulate solids through vessels.

According to the present invention the rate of flow of a stream of particulate solid in substantially stream-line flow through a vessel is measured by apparatus which comprises means for changing the temperature of a portion of the stream of particulate solid, and means for determining the moment when the said portion passes one or more selected points downstream of the temperature changing means, and including a temperature-sensitive element at the selected point or points.

Knowing the moment when the temperature of the portion of particulate solid is changed, the distance between the point of heating and a temperature-sensitive element, or between the two temperature-sensitive elements and the moment when the heated portion of particulate solid arrives at these temperature-sensitive elements, the rate of flow of the particulate solid is determined.

In this specification a vessel should be understood as one in which the particulate solid is being subjected to physical or chemical treatment or in which physical or chemical actions are occurring in the presence of the particulate solid. The word "vessel" should also be understood to include conduits or pipes through which particulate solid is flowing to other vessels such as reaction chambers or storage bins.

Furthermore, in this specification stream-line flow as referred to the stream of particulate solid is intended to mean particulate solid flowing substantially without turbulence through a vessel.

The change in temperature of the portion of the particulate solid may be by way of a temperature increase or decrease as convenient, taking into consideration other factors such as the nature of the particulate solid and the physical and/or chemical conditions under which it is flowing. In general it is convenient to arrange for the temperature of the particulate solid to be increased.

The temperature of the portion of particulate solid may be changed by a variety of means which may be such that a portion of particulate solid extending across the whole cross-section of the vessel in which it is flowing is substantially uniformly heated or cooled. Hereinafter this will be referred to as symmetrical heating or cooling: with some materials and sets of operating conditions however it may be desirable to change the temperature of the portion of particulate solid so that it does not extend across the whole cross-section of the vessel. Hereinafter this will be referred to as unsymmetrical heating or cooling.

When an increase in temperature is desired a heating device may be suitably disposed on or in the wall of the vessel containing the particulate solid, to which device heat may be supplied by electrical or other means when desired. The heating device may take the form of an electrical winding on a chosen part of the vessel and insulated therefrom, or it may be a suitably disposed coil through which super-heated steam or a heat transferring liquid at a suitable temperature is passed. It will be understood that if the whole of the flowing particulate solid is already hot it may be desirable to cool a portion thereof according to the process of the present invention. Such cooling may be obtained by passing a cooling medium through the hereinbefore mentioned coils or by evaporating a suitable liquid therein. These methods of heating or cooling are examples of symmetrical cooling as hereinbefore defined. By suitable design these methods of heating or cooling may be arranged to produce symmetrical or unsymmetrical heating or cooling, as desired. When the electrical conductivity of the particulate solid is suitable it is particularly advantageous to heat the portion of the particulate solid by the passage therethrough, at suitable points, of electrical current to obtain so-called resistance heating. An example of such material is coke in particulate form. For resistance heating the electrical current may be supplied to a series of uniformly distributed electrodes protruding through the walls of the vessel in the same plane, whereby a portion of the particulate solid material is symmetrically heated. Alternatively a portion of the particulate solid may be heated unsymmetrically by suitable arrangement of two or more electrodes.

Other methods of heating the portion of particulate solid and which may be used according to the nature of the particulate solid and the operating conditions are eddy current induction heating, high frequency dielectric heating, or heating by localized chemical action.

According to the conditions prevailing where it is desired to measure the rate of flow of particulate solid the temperature sensitive element or elements may be thermometers depending on the change in volume of a fluid for their action, thermocouples, resistance thermometers, optical pyrometers, or bimetal strips in conjunction with suitable indicating devices such as millivoltmeters or recording potentiometers. The choice of temperature-sensitive element and indicating device may depend on many factors among which may be mentioned the nature of the particulate solid material, its temperature, the temperature difference which can be tolerated or can be obtained by heating or cooling the portion of particulate solid material, and its rate of flow. With particulate coke for example the use of thermocouples is not entirely satisfactory due to the time lag between the arrival of the heated portion of particulate solid adjacent the junction of the thermocouple and the response thereto as indicated for example by a millivoltmeter.

It should be understood that the extent of the temperature change is unimportant so long as it can be satisfactorily detected by the temperature-sensitive elements, and it is not essential to measure the extent of the temperature change.

The time taken for the passage of the portion of the stream of particulate solid having a changed temperature from the point of heating to any of the temperature-sensitive elements or between any pair of temperature-sensitive elements may be measured by stop watch, while observing the instants at which heating occurs and at which the heated portion of particulate solid passes the temperature-sensitive element, such passage being indicated by the change in temperature recorded by the temperature-sensitive device. Where the thermocouples or optical pyrometer are used in conjunction with a temperature-indicating device the latter may be of the type in which temperatures from two or more temperature-sensitive elements are recorded on a moving chart at definite uniform time intervals which are also indicated on the chart. Thus the time interval between the inflections in the temperature records of a pair of temperature-sensitive elements would be a measure of the time taken for the portion of particulate solid having a changed temperature to pass the two temperature-sensitive elements. Alternatively, where the temperature-indicating device has a moving chart as hereinbefore described, only one temperature-sensitive device may be located downstream of the means for changing the temperature of a portion of the stream of particulate solid, in which case means may also be provided to indicate, on the chart, the instant at which the temperature change was produced, whereby the time elapsing between such temperature change and the inflection produced on the chart by the arrival of the heated portion of particulate solid at the temperature-sensitive element is indicated on the chart. Where thermo-electric temperature-sensitive elements are used, the current generated therein may be used to operate relays or amplifiers which in turn bring into operation suitable indicating devices.

*Example*

One form of the process and apparatus of the present invention will now be described by reference to the accompanying drawings in which Figure 1 represents diagramatically and in vertical cross-sectional elevation, a tube through which particulate coke is flowing. Figure 2 is a section of Figure 1 on the line XY. Figure 3 presents a section of a chart produced as hereinafter described.

The numeral 1 indicates a tube down which particulate coke is flowing. The numerals 2, 3, 4 and 5 represent carbon electrodes supported by insulated sleeves 6, 7, 8 and 9, the electrodes protruding through the walls of the tube 1. Electrodes 2 and 3 which are close together to one side of the tube and in the same horizontal plane, are connected to a source of electrical current 10 through an automatic time switch 11 by means of which current is switched on for a short period at regular time intervals. 4 and 5 are electrodes arranged at a measured distance below the electrodes 2 and 3. Electrodes 4 and 5 are diametrically opposite each other in the walls of the tube and are connected to a direct current amplifier 12 which in turn is connected to a high speed pen recorder 13 in which the chart 14 is a strip of paper drawn at regular high speed across the stylus of the recorder, the stylus being arranged to move in response to current impressed on the apparatus. The switch 11 is also suitably connected through the series resistance 17 and the rectifier 18 to the high speed pen recorder 13 as shown in Figure 1 of the drawings. In operation, with coke flowing down the tube 1, the automatic time switch 11 closes for a short interval of time, usually a few seconds, whereby the coke in the immediate vicinity of the electrodes 2 and 3 is heated by resistance heating. At the same time by the arrangement shown in Figure 1 of the drawings including series resistance 17 and rectifier 18 between the automatic time switch 11 and the high speed pen recorder 13, a momentary impulse is transmitted to the stylus of the latter and this impulse is indicated on the chart 14, Figure 3, by inflections such as 15. This form of heating is unsymmetrical heating and results in the production of a heated portion of particulate coke in the neighbourhood of the electrodes and the adjacent walls of the tube. The heated portion of coke travels the measured distance down the tube and comes opposite the pair of electrodes 4 and 5. Thus, the electrode 4 and the hot coke in the vicinity form a hot junction and the electrode 5 and cooler coke in its vicinity form a cold junction of a thermo-electrical system. Current is thus generated and is fed to the direct current amplifier 12 and the high speed pen recorder 13, whereby a further impulse is transmitted to the stylus of the pin and is recorded on the chart 14 by an impulse such as 16. The chart 14 moves smoothly and continuously from right to left and is graduated in time along its length and any convenient unit, preferably temperature along its height. Thus, knowing the distance between the two pairs of electrodes 2, 3 and 4, 5 and the time elapsing between the inflections 15 and 16, the rate of flow of particulate coke is determined.

In the accompanying drawings, for clarity of illustration, electrode 3 is shown vertically above electrode 4. In practice however it is desirable for electrodes 2 and 3 to be as placed that when viewed from above, they appear to be symmetrical about electrode 4.

We claim:

1. Apparatus for measuring the rate of flow of a stream of particulate solids of substantially uniform temperature in substantially streamlined flow through a vessel which comprises a heating means adapted to be intermittently actuated mounted in the vessel wall and located in the path of the stream of particulate solids to heat said stream, a timing device connected to the said heating means so that the fact of heating will be indicated upon the timing device, at least one thermo-responsive means mounted in the vessel wall and located in the path of the stream of particulate solids downstream of the said heating means, all of the said thermo-responsive means being connected to the said timing device whereby the fact of passage of the hotter region of particulate solids in respect to the said thermo-responsive means will be indicated upon the said timing device to indicate the elapsed time for the heated portion of the said particulate solids to traverse the known distance either between the said heating means and the first of the said thermo-responsive means or between the first of the said thermo-responsive means and the remainder of said thermo-responsive means to provide an indication of the speed of the stream of particulate solids.

2. An apparatus as recited in claim 1 in which the said thermo-responsive means are optical pyrometers.

3. An apparatus as recited in claim 1 in which the particulate solids are electrically conductive and the heating means comprises a series of electrodes attached to a source of electric current, protruding into the vessel wall and distributed in a plane at right angles to the direction of flow of particulate solids, the source of current of the said electrodes being electrically connected to the timing device.

4. An apparatus as recited in claim 3 in which the said electrodes are distributed for heating only a portion of the stream of particulate solids, the said heated portion occupying only a part of the cross-sectional area of the vessel taken at the point of application of heat by the said series of electrodes, and in which the thermo-responsive means are thermo-electric systems each of which comprise a pair of electrodes, one of said pair of electrodes forming the hot junction of the thermo-electric system with the heated portion of particulate solids, the said thermo-electric systems being electrically connected to the timing device so that when the heated portion of particulate solids heats the hot junction of the thermo-electric system the resulting flow of electricity will be indicated upon the timing device.

RONALD JAMES MORLEY.
SELWYN FORBES WESTON.

REFERENCES CITED

The following references are of record in the file of this patent:

UNITED STATES PATENTS

| Number | Name | Date |
|---|---|---|
| 1,291,489 | Hadaway | Jan. 14, 1919 |
| 1,611,502 | Allen | Dec. 21, 1926 |
| 2,344,771 | Halliburton | Mar. 21, 1944 |
| 2,353,382 | Barrett | July 11, 1944 |